United States Patent
Hartmann et al.

(10) Patent No.: US 12,374,879 B2
(45) Date of Patent: Jul. 29, 2025

(54) CIRCUIT ASSEMBLY AND METHOD FOR PROVIDING ELECTRIC POWER FOR LARGE DC LOADS

(71) Applicants: Eric Hartmann, Kempen (DE); Karsten Wenzel, Krefeld (DE)

(72) Inventors: Eric Hartmann, Kempen (DE); Karsten Wenzel, Krefeld (DE)

(73) Assignee: KK Wind Solutions A/S, Ikast (DK)

( * ) Notice: Subject to any disclaimer, the term of this patent is extended or adjusted under 35 U.S.C. 154(b) by 0 days.

(21) Appl. No.: 18/524,056

(22) Filed: Nov. 30, 2023

(65) Prior Publication Data

US 2024/0097551 A1 Mar. 21, 2024

Related U.S. Application Data

(63) Continuation of application No. PCT/EP2022/064417, filed on May 27, 2022.

(30) Foreign Application Priority Data

Jun. 1, 2021 (DE) ............. 10 2021 114 207.5

(51) Int. Cl.
*H02H 7/125* (2006.01)
*C25B 9/23* (2021.01)
(Continued)

(52) U.S. Cl.
CPC ............. *H02H 7/1252* (2013.01); *C25B 9/23* (2021.01); *C25B 9/65* (2021.01); *H02H 7/1213* (2013.01);
(Continued)

(58) Field of Classification Search
CPC .......... H02H 9/041; H02H 9/043; H02H 9/02; H02H 9/025; H02H 9/023; H02H 9/026;
(Continued)

(56) References Cited

U.S. PATENT DOCUMENTS

| | | | |
|---|---|---|---|
| 10,027,112 B2 | 7/2018 | Krstic | |
| 2009/0135628 A1* | 5/2009 | Ye | H02M 7/2176 363/21.04 |
| 2014/0097093 A1* | 4/2014 | Showalter | H02M 3/155 204/267 |
| 2019/0245432 A1 | 8/2019 | Yan et al. | |

(Continued)

FOREIGN PATENT DOCUMENTS

| | | |
|---|---|---|
| CN | 201323531 Y | 10/2009 |
| DE | 102005007377 A1 | 8/2006 |

(Continued)

OTHER PUBLICATIONS

Sanzhong Bai et al: "Optimum design of an EV /PHEV charging station with DC bus and storage system", Energy Conversion Congress and Exposition (ECCE), 2010 IEEE, IEEE, Piscataway, NJ, USA, Sep. 12, 2010 (Sep. 12, 2010), pp. 1178-1184, XP031787052, ISBN: 978-1-4244-5286-6.

(Continued)

*Primary Examiner* — Nguyen Tran
(74) *Attorney, Agent, or Firm* — Reinhart Boerner Van Deuren P.C.

(57) ABSTRACT

A circuit arrangement for providing electrical power for at least one DC load from at least one alternating current source having a primary DC intermediate voltage circuit. The primary DC intermediate voltage circuit is supplied with electrical power of the alternating current source via two rectifiers connected in series such that a centre point tap is provided, means for limiting the DC output voltage of the associated rectifier are provided between the centre point tap of the primary DC intermediate voltage circuit and at least one DC potential of the primary DC intermediate voltage circuit, which can limit the DC output voltage of at least one of the rectifiers connected in series in the event of a fault state in the DC load, in the secondary DC intermediate (Continued)

voltage circuit and/or in at least one of the DC/DC converters.

15 Claims, 1 Drawing Sheet

(51) Int. Cl.
    *C25B 9/65*            (2021.01)
    *H02H 7/12*            (2006.01)
    *H02H 9/04*            (2006.01)
    *H02J 5/00*             (2016.01)
    *H02M 1/00*           (2006.01)
    *H02M 3/155*          (2006.01)
    *H02M 7/155*          (2006.01)

(52) U.S. Cl.
    CPC ............... *H02H 9/041* (2013.01); *H02J 5/00* (2013.01); *H02M 1/0074* (2021.05); *H02M 1/0077* (2021.05); *H02M 1/0085* (2021.05); *H02M 3/155* (2013.01); *H02M 7/1552* (2013.01)

(58) Field of Classification Search
    CPC ........ H02H 9/028; H02H 9/001; H02H 9/002; H02H 7/1252; H02H 7/1213; H02H 7/1255; H02H 7/127; H02H 7/205; H02H 7/22; H02H 7/125; H02H 7/1225; H02H 7/122; H02H 7/1216; H02H 7/12; H02H 7/1203; H02H 7/12
    See application file for complete search history.

(56) References Cited

U.S. PATENT DOCUMENTS

2020/0403493 A1* 12/2020 Ljushev .................. H02P 27/06
2021/0036629 A1   2/2021 Joyce
2021/0175704 A1*  6/2021 Askan ...................... H02H 7/16

FOREIGN PATENT DOCUMENTS

| | | |
|---|---|---|
| EP | 1931023 A1 | 6/2008 |
| EP | 2228894 A1 | 9/2010 |
| EP | 3556905 A1 | 10/2019 |
| WO | WO 2016/012061 A1 | 1/2016 |
| WO | WO 2020/237662 A1 | 12/2020 |

OTHER PUBLICATIONS

Guida Vittorio et al: "Candidate Interleaved DC-DC Buck Converters for Electrolyzers: State-of-the-Art and Perspectives", 2018 IEEE International Conference on Environment and Electrical Engineering And 2018 IEEE Industrial and Commercial Power Systems Europe (EEEIC / I&CPS Europe), IEEE, Jun. 12, 2018 (Jun. 12, 2018), pp. 1-6, XP033422620, DOI: 10.1109/EEEIC.2018.8494457.

M. Rivera et al., Three-Phase AC-DC Converters with Passive Active and Hybrid Current Injection Circuits—Part I, Jun. 2018.

* cited by examiner

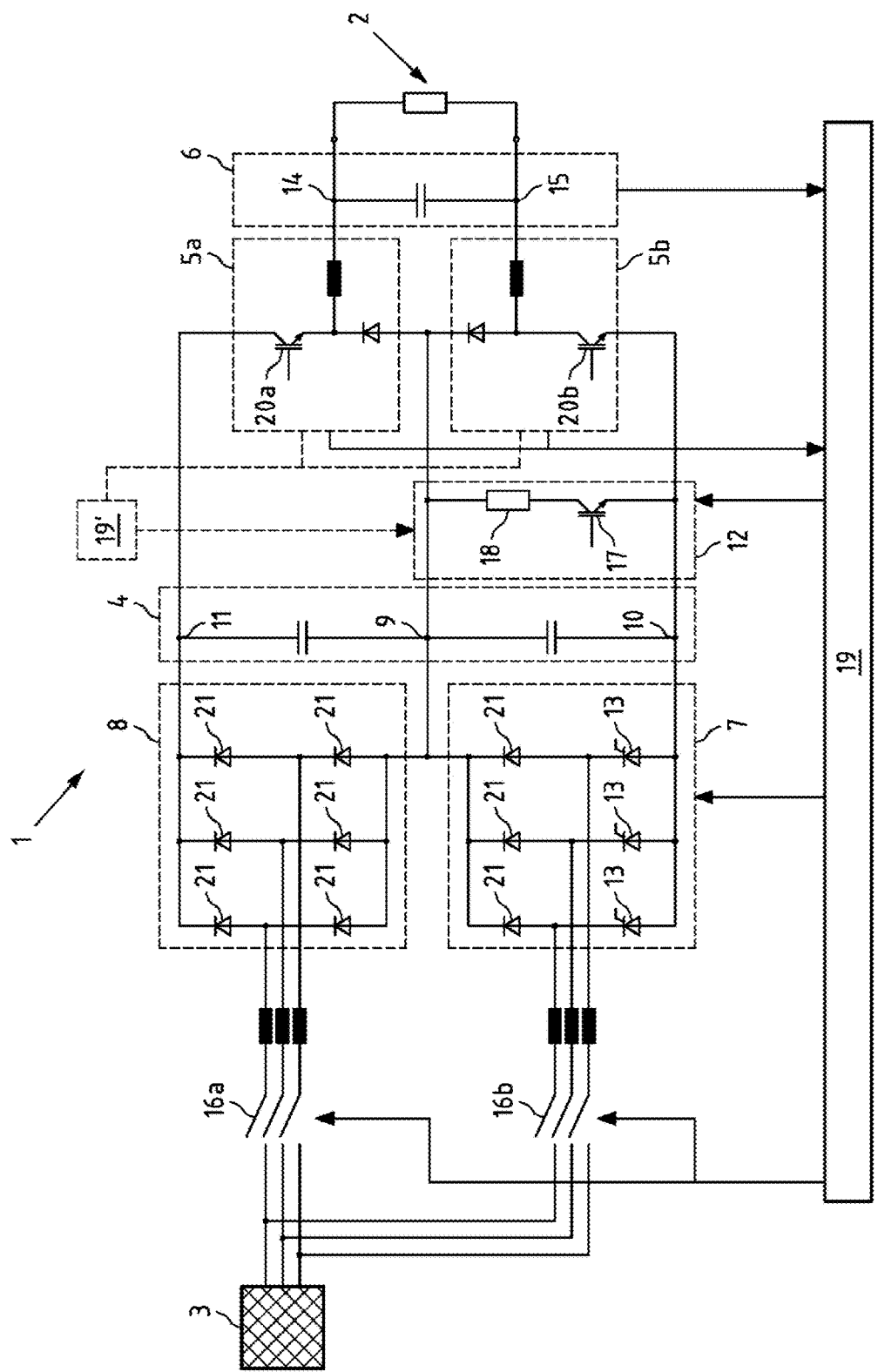

CIRCUIT ASSEMBLY AND METHOD FOR PROVIDING ELECTRIC POWER FOR LARGE DC LOADS

CROSS-REFERENCE TO RELATED PATENT APPLICATIONS

This patent application is a continuation of International Application No. PCT/EP2022/064417, filed on May 27, 2022, which claims the benefit of priority to German Patent Application No. 10 2021 114 207.5, filed Jun. 1, 2021, the entire teachings and disclosures of both applications are incorporated herein by reference thereto.

FIELD OF THE DISCLOSURE

The invention relates to a circuit arrangement for providing electrical power for at least one DC load, in particular for at least one electrolyser cell, from at least one alternating current source having a primary DC intermediate voltage circuit, which is connected via DC/DC converters to a secondary DC intermediate voltage circuit, which supplies the at least one DC load with electrical power. In addition, the invention also relates to a method for providing electrical power of at least one alternating current source for at least one DC load, in particular at least one electrolyser cell with a circuit arrangement according to the invention.

BACKGROUND OF THE INVENTION

The hydrogen economy plays a key role for realising climate-neutral industrial processes. Hydrogen and other synthetically generated energy carriers are to be used where renewable electricity cannot currently be used as an energy source. In electrolysis processes, an electrical current is used to initiate a chemical reaction that, for example, splits water into its components oxygen and hydrogen. In water electrolysis, so-called electrolyser cells are used. Alkaline electrolyser cells are currently operated with voltages of up to 600 V and currents of up to 40 kA or more. This results in power outputs of up to 24 MW and more. Proton exchange membrane electrolyser cells, so-called PEM electrolyser cells, require an electrical voltage of 700 to approx. 1400 V and are operated at a power output of up to approx. 5 MW with currents of 2-4 kA. Besides this, solid oxide cells (SOEC) are also operated at around 700-1400 V with power outputs of 100-300 kW. Here too, an upscaling to the megawatt range seems to be foreseeable. Electrolyzer cells therefore represent DC loads, which require particularly high power outputs. Electrical energy is usually distributed and delivered to the end consumers via alternating current grids. However, electrolyser cells are operated with direct voltage, so rectification is required. With these high power outputs, protection concepts for both the rectifiers and the electrolysis cells are also very important.

From the European patent application EP 3 556 905 A1, for example, a circuit arrangement for operating an electrolysis cell is known, in which an alternating voltage is first rectified into a first direct voltage and then the first direct voltage is converted into a second, lower direct voltage. To protect the electrolyzer cell, the power output of the alternating voltage rectifier and also of the down converters or buck converters can be adjusted. As a result, the current flow through the electrolyzer cell can be kept in the safe range in the event of changes in the resistances of the electrolyzer cell due to ageing phenomena. However, a protection concept for component failure, for example of the buck converters, is not disclosed.

In the article "Candidate Interleaved DC-DC Buck Converters for Electrolyzers: State-of-the-Art and Perspectives" by V. Guida, D. Guilbert and B. Douine in "2018 IEEE International Conference on Environment and Electrical Engineering and 2018 IEEE Industrial and Commercial Power Systems Europe", 12-15 Jun. 2018, ISBN 978-1-5386-5186-5, DOI: 10.1109/EEEIC.2018.8494457, down converters for electrolyser cells are disclosed, which can, for example, be connected downstream of a rectifier of a wind turbine.

The German patent application DE 10 2005 007 377 A1 shows a power supply unit for generating a low direct voltage from a high alternating voltage with a rectifier and connected to it, a series connection of a switching element and a storage element.

The Chinese utility model CN 2 01 323 531 Y discloses a high-voltage frequency converter with rectifiers, direct current intermediate circuit, three-stage bridge circuits and an output filter.

From the article, Candidate Interleaved DC-DC Buck Converters for Electrolyzers: State-of-the-Art and Perspectives", V. Guida et al, 2018 IEEE International Conference On Environment and Electrical Engineering, XP033422620, the use of DC/DC down converters in electrolysers is described.

Further, from U.S. Pat. No. 10,027,112 B2, the use of rectifiers connected in series for a DC load is known, wherein in the event of a fault, one of the rectifiers is bypassed.

A DC power supply system which uses buck converters on the DC voltage side to set switching voltage levels is known from the European patent application EP 1 931 023 A1.

The international patent application WO 2016/012061 A1 shows an electrolysis system comprising a rectifier unit with a series connection of two bridge rectifiers.

Transformer rectifiers are known from US patent application US 2021/0036629 A1, which are used for DC power supply.

The international patent application WO 2020/237662 A1 discloses devices for overvoltage protection in the form of brake choppers for NPC converters, while the US patent application US 2019/0245432 A1 shows a charging device for electric vehicles which, besides a PFC rectifier with a neutral point layout, also has a DC/DC converter at the DC output. Two rectifiers connected in series and means for limiting the output voltages of the rectifiers are not disclosed.

In the article by SANZHONG BAI ET AL: "Optimum design of an EV/PHEV charging station with DC bus and storage system", ENERGY CONVERSION CONGRESS AND EXPOSITION (ECCE), 2010 IEEE, different concepts for the provision of electrical energy for a device for charging batteries with direct current are described. The main focus here is on the capacity of the grid connection. Protection concepts for the occurrence of problems in the DC load, a secondary intermediate circuit or in a DC/DC converter are not described.

SUMMARY OF THE INVENTION

The present invention has therefore set itself the object of providing a circuit arrangement for providing electrical power for at least one DC load, in particular for at least one electrolyser cell, with which not only a whole range of electrolyser cells can be supplied with direct voltage, but also at the same time an effective protection concept can be provided in the event of fault states in the DC load, the DC/DC converter or the associated secondary DC intermediate voltage circuit.

According to a first teaching of the present invention, the object outlined is achieved with a circuit arrangement having features of the present disclosure. According to the invention, the primary DC intermediate voltage circuit is supplied with electrical power of the alternating current source via two rectifiers connected in series such that a centre point tap is provided. At least one of the rectifiers connected to the primary DC intermediate voltage circuit has switchable circuit breakers (13). In addition, means are provided which can switch off at least a part of the switchable circuit breakers of this rectifier as soon as a fault state is detected in the DC load, in the secondary DC intermediate voltage circuit and/or in the at least one DC/DC converter. Furthermore, means for limiting the DC output voltage of the associated rectifier are provided between the centre point tap of the primary DC intermediate voltage circuit and at least one DC potential of the primary DC intermediate voltage circuit, which can reduce the DC output voltage of the at least one rectifier connected in series when a fault state in the DC load, the secondary DC intermediate voltage circuit and/or in at least one DC/DC converter is detected.

Due to the rectifiers connected in series, the circuit arrangement according to the invention can provide in the primary DC intermediate voltage circuit up to a maximum of double the direct voltages starting from the voltage of an alternating voltage source, so that a large range of electrolyzer cells can be supplied with direct voltage starting from an alternating current source. The topology with two rectifiers connected in series with centre point tap in addition leads to an effective protection concept of the electrolyser cells. Due to the high power requirements of the electrolyser cells, the known DC/DC converters also have to switch high power outputs. This can lead to through-alloying as a result of a component fault, such that significantly excessive voltages or significantly excessive currents can be measured in the secondary DC intermediate voltage circuit.

Due to the means for limiting the DC output voltage of at least one of the rectifiers of the primary DC intermediate voltage circuit in the event of a fault state, the voltage of the primary DC intermediate voltage circuit can be reduced particularly effectively and quickly and excess energy can be dissipated from the short-circuited rectifier, for example via a switchable load. Since the voltage limitation already takes place in the primary DC intermediate voltage circuit, all subsequent assemblies can be effectively protected against damage.

If, according to the circuit arrangement according to the invention, at least one of the rectifiers connected to the primary DC intermediate voltage circuit has switchable circuit breakers, in particular thyristors, and means are provided which can switch off at least a part of the switchable circuit breakers of this rectifier as soon as a fault state is detected in the DC load, the secondary DC intermediate voltage circuit and/or at least one DC/DC converter, the electrical energy to be dissipated when limiting the DC output voltage of the rectifier can be significantly limited. Switchable circuit breakers allow the energy flow from the alternating current source to the primary DC intermediate voltage circuit to be prevented already after 10 ms, for example. Inexpensive switchable circuit breakers with such switching characteristics are, for example, thyristors. They can be used as switchable circuit breakers in at least one of the rectifiers of the primary DC intermediate voltage circuit for rectifying high alternating current power outputs. Thyristors that only switch to the locked state at the next current zero-crossing of the alternating voltage, which follows after a maximum of 10 ms at 50 Hz grid frequency, then block the energy flow from the alternating current source into the primary DC intermediate voltage circuit. In combination with the limitation of the DC output voltage of the associated rectifier, very effective protection against overvoltages or overcurrents in the secondary DC intermediate voltage circuit and the downstream DC load can be achieved. The means for limiting the DC output voltage of the at least one rectifier can also be adapted to the switching speed of the switchable circuit breakers used and can accordingly be cost-effective.

The rectifiers connected in series usually each have a B6 bridge circuit in the case of a three-phase alternating current source. A particularly cost-effective variant has three switchable circuit breakers only in the top or in the bottom arrangement of a rectifier, so that the power flow from the alternating current source is prevented. It is therefore sufficient, for example, to provide only three switchable circuit breakers in a top/bottom arrangement and also to use diodes in the rectifiers connected in series. Furthermore, means of the circuit breakers, for example corresponding control units, are preferably provided, which can switch off the switchable circuit breakers of the rectifiers in the event of a fault state.

An advantageous configuration of the circuit arrangement can be provided in that two DC/DC converters are provided for the secondary DC intermediate voltage circuit, wherein both DC/DC converters are electrically conductively connected in each case with a different DC potential of the secondary DC intermediate voltage circuit and with the centre point tap and in each case with a DC potential of the primary DC intermediate voltage circuit that is different from the centre point tap. In addition, the use of two DC/DC converters per secondary DC intermediate voltage circuit makes it possible to use more cost-effective components also for the DC/DC converters, since the power flow is distributed to two DC/DC converters at reduced voltage starting from the centre point tap of the primary DC intermediate voltage circuit.

In order to ensure the power requirement in particular of one or a plurality of electrolyzer cells, the circuit arrangement according to a further configuration is designed to provide the at least one DC load with a power output of 2.5 kW to 25 MW or more, preferably 100 kW to 10 MW. This makes it clear once again that with these requirements for the power supply from a secondary DC intermediate voltage circuit, the protection concept according to the invention is of great significance for safe operation of the electrolyser cells.

A particularly fast limiting of the output voltage of the at least one rectifier is achieved according to a further configuration in that at least one voltage limiter with semiconductor circuit breakers, in particular with at least one IGBT module and a limiting resistor, is provided as a means for limiting the output voltage of the at least one rectifier. Voltage limiters, also known as choppers, can dissipate the energy in the part of the primary DC intermediate voltage circuit particularly effectively and in an extremely short time, for example via a switchable load. The voltage in this part of the primary DC intermediate voltage circuit drops to a very small value within approximately 1-5 ms or less. The voltage in the rectifier is thus greatly reduced even before a rectifier with thyristors is turned off, which occurs after a maximum of 10 ms at a grid frequency of 50 Hz, and damage to the DC load or the electrolyzer cells due to the energy still present in the rectifier is avoided. In addition to IGBT modules, other semiconductor circuit breakers, such as IGCT circuit breakers or MOSFET transistors for example, can also be used.

In addition, according to a further configuration of the circuit arrangement, disconnectors or switchable circuit breakers can be provided for galvanic isolation of the alternating current source from the rectifiers of the primary DC intermediate voltage circuit. The disconnectors or circuit breakers serve to galvanically isolate the alternating current source from the circuit arrangement. Galvanic isolation from the alternating current source usually takes much longer, so limiting the DC output voltage of at least one rectifier avoids the effects of delayed galvanic isolation.

Preferably, the means for switching off the circuit breakers of the rectifiers and/or means for limiting the DC output voltage of the at least one rectifier and/or for galvanically isolating the circuit arrangement from the alternating current source are controlled by at least one or a plurality of separate, decentralised control units or by a central control unit. For this purpose, fault status signals are evaluated and the control commands to the means for switching off the circuit breakers of the rectifiers and for limiting the DC output voltage of at least one rectifier or for galvanically isolating the alternating current source are then generated and relayed. Decentralised control units have the advantage that, due to the short signal paths, control commands to the means for limiting the DC output voltage can be transmitted after a particularly short time.

A particularly easily adjustable power output from the primary DC intermediate voltage circuit to the secondary DC intermediate voltage circuit is achieved in that at least one or all DC/DC converters are provided in the form of buck converters with circuit breakers. Preferably, control means are provided for the circuit breakers, which only switch through one of the circuit breakers of the two DC/DC converters at the same time in case of power output from the primary DC intermediate voltage circuit to the secondary DC intermediate voltage circuit. IGBT modules are preferably used as circuit breakers here. These can also be completely blocked so that no more power flows from the primary DC intermediate voltage circuit to the secondary DC intermediate voltage circuit. IGCT modules or MOSFET transistors can also be used here.

An advantageous configuration of the circuit arrangement is provided in that means for measuring current and/or for measuring voltage are provided in the secondary DC intermediate voltage circuit and/or in the DC load in order to detect fault states in the secondary DC intermediate voltage circuit or the DC load and to preferably relay them to a decentralised or central control unit.

A further advantageous configuration of the circuit arrangement is provided in that means for sensing fault states are provided in at least one DC/DC converter, which can detect fault states in at least one of the circuit breakers and preferably relay them to a decentralised or central control unit. Preferably, means for sensing fault states are also integrated in the circuit breakers used, for example IGBT modules. IGBTs are preferably used as circuit breakers here. Fault states can be detected, for example, by monitoring the collector-emitter voltage. Such monitoring is carried out by default in the associated IGBT drivers and, when a fault state is detected, the switching of the IGBT is blocked by the driver.

Since the circuit arrangement according to the invention can provide particularly wide DC voltage intervals, at least one alkaline electrolyzer cell, at least one AEM (anion exchange membrane) electrolyzer cell and/or PEM (proton exchange membrane or also polymer electrolyte membrane) electrolyzer cell and/or at least one solid oxide electrolyzer cell (SOEC) are provided as DC loads. All electrolyzer cell types require specific voltage ranges which the circuit arrangement can provide without problems in the secondary DC intermediate voltage circuit. The aforementioned electrolyser cells can still be operated in the low-voltage range with the circuit arrangement according to the invention. In addition, the components of the circuit arrangement as well as the electrolyzer cell itself are protected against damage due to faulty operating states.

According to a second teaching of the present invention, the object outlined above for a method for providing electrical power of at least one alternating current source for at least one DC load, in particular at least one electrolyzer cell with a circuit arrangement according to the invention, is achieved in that at least one DC output voltage of a rectifier connected in series is reduced via means for limiting the DC output voltage in the event of a fault state in the at least one DC load, in the secondary DC intermediate voltage circuit and/or in at least one DC/DC converter. This measure avoids an impermissible voltage increase in the secondary DC intermediate circuit within a few milliseconds and reliably prevents damage to the DC load or the electrolyzer cell. Limiting the DC output voltage of one of the rectifiers connected in series is thereby sufficient, such that the switching effort is low here. In principle, both rectifiers connected in series can also be limited with respect to their DC output voltage in the event of a fault state.

According to a further configuration of the method, at least one circuit breaker of at least one of the two rectifiers connected in series is switched off in the event of a fault state in the at least one DC load, in the secondary DC intermediate voltage circuit and/or in at least one DC/DC converter, preferably simultaneously with limiting the DC output voltage. As a result, the electrical energy still present in the rectifier can be dissipated particularly quickly, such that the rectifier is de-energised. The switchable circuit breakers are preferably designed as thyristors in order to use circuit breakers that are as cost-effective as possible.

If the control commands for switching off the circuit breakers and limiting the DC output voltage of the at least one rectifier are transmitted simultaneously, a power-optimised dimensioning of the means for limiting the DC output voltage of the rectifier, for example the voltage limiter with limiting resistor, can be made in order to save costs.

In addition, also both rectifiers of the primary DC intermediate voltage circuit connected in series can be switched off, preferably simultaneously with limiting the DC output voltage of the at least one rectifier, in order to de-energise the entire secondary DC intermediate voltage circuit. Preferably, the top and bottom circuit breakers of the rectifiers, which are preferably designed as thyristors, are switched off or turned off.

According to a next configuration of the method, in the event of a fault state in the at least one DC load, in the secondary DC intermediate voltage circuit and/or in at least one DC/DC converter, galvanic isolation of the circuit arrangement from the alternating current source in the event of a fault can be provided in that the alternating current source is isolated from the rectifiers connected in series by disconnectors or corresponding circuit breakers. This provides an additional safety mechanism to protect the electrolyzer cell from damage in the event of a fault. However, galvanic isolation usually takes about 50 to 100 ms. Due to the faster, preceding protective measures, the relatively long time span until galvanic isolation of the circuit arrangement plays only a minor role.

Preferably, the actuation of the DC/DC converters is also stopped in the event of a fault, such that almost instantaneously no more energy can flow from the primary DC intermediate voltage circuit to the secondary DC intermediate voltage circuit.

The control commands for switching off the circuit breakers of the rectifiers of the primary DC intermediate voltage circuit, for limiting the DC output voltage of at least one rectifier and/or for galvanically isolating the circuit arrangement can be carried out via one or a plurality of decentralised control units or a central control unit to the circuit arrangement. A decentralised control unit can usually provide faster switching times due to shorter signal paths, whereas a central control unit can reduce the costs of the circuit arrangement, as only the corresponding switching inputs for actuating the circuit breakers, disconnectors, etc. must be provided.

In order to protect the DC loads or the electrolyzer cell from unstable operating points, an excessively high voltage, an excessively high current in the secondary DC intermediate voltage circuit or a fault state in the DC/DC converter, for example in the semiconductor circuit breaker of the DC/DC converter, is detected as a fault state.

At the same time, fault states can also be transmitted from the DC loads themselves, i.e. from the electrolyzer cell itself, to the circuit arrangement according to the invention, the decentralised control unit or the central control unit, which then initiates corresponding measures, such as limiting the DC output voltage of a rectifier, switching off the rectifier, galvanically isolating the alternating current sources or also stopping the actuation of the circuit breakers of the DC/DC converters.

BRIEF DESCRIPTION OF THE DRAWINGS

The invention will be described in greater detail below by means of an exemplary embodiment in connection with the drawing. The drawing shows in:

FIG. 1 is an exemplary embodiment of a circuit arrangement according to the invention for providing electrical power for a load.

DETAILED DESCRIPTION

In FIG. 1, there is a circuit arrangement 1 for providing electrical power for at least one DC load 2, which in the present case is designed as an electrolyser cell, for example alkaline electrolyser cell, AEM or PEM electrolyser cell or solid oxide electrolyser cell. An electrical grid 3 is indicated here as an alternating current source 3. According to the invention, the circuit arrangement 1 has a primary DC intermediate voltage circuit 4, which is connected to a secondary DC intermediate voltage circuit 6 via DC/DC converters 5a, 5b. The secondary DC intermediate voltage circuit 6 supplies the DC load 2 with electrical power. A plurality of secondary DC intermediate voltage circuits 6 with associated DC load 2 can be assigned to each primary DC intermediate voltage circuit 4. As an example, only one secondary DC intermediate voltage circuit 6 is shown in FIG. 1. The secondary DC intermediate voltage circuit can be adapted specifically to the connected DC load 2, i.e. electrolyser cell, for example.

The primary DC intermediate voltage circuit 4 is supplied with electrical power of the alternating current source 3 via two rectifiers 7, 8 connected in series. Thus, the primary DC intermediate voltage circuit 4 provides a centre tapping point 9. In addition, means 12 for limiting the DC output voltage of at least one of the rectifiers 7, 8 are provided. Thereby, the DC output voltage of at least one rectifier 7, 8 can be reduced in the event of a fault state in the DC load 2, in the secondary DC intermediate voltage circuit 6 and/or in a DC/DC converter 5a, 5b.

By limiting the DC output voltage of at least one rectifier 7, 8, the energy of the rectifier 7 present in the corresponding part of the primary DC intermediate voltage circuit 4 is dissipated into heat via the limiting resistor 18, so that the energy flow from the voltage-limited rectifier 7 into the secondary DC intermediate voltage circuit 6 can be stopped after a particularly short period of time, approx. 1 to 5 ms. In principle, means for limiting the DC output voltage of the rectifier 8 can also be provided in order to also dissipate the energy from the rectifier 8 as quickly as possible.

The rectifiers 7, 8 in the primary DC intermediate voltage circuit 4 preferably have thyristors 13 as switchable circuit breakers. However, for cost reasons, it is not required that all circuit breakers are switchable, so that diodes 21, in particular power diodes, can be used as non-switchable circuit breakers. In the event of a fault already described, the current flow from the alternating voltage side into the primary DC intermediate voltage circuit 4 should be prevented. For this purpose, it is sufficient, for example, to design the three circuit breakers in the bottom arrangement in the rectifier 7, which are connected to the negative potential 10 of the primary DC intermediate voltage circuit, as thyristors. If these three thyristors are blocked, there is no closed current loop between any of the alternating voltage phases via the DC intermediate voltage circuit, such that no more energy can be introduced from the alternating voltage side. The other three circuit breakers, which are connected to the centre point tap 9 of the primary DC intermediate voltage circuit 4, can be designed as (power) diodes 21. Of course, all six circuit breakers of the rectifier 7 can also be designed as thyristors. Similarly, the rectifier 8 can be designed with three or six thyristors. In principle, other circuit breakers such as IGBT modules can also be used, but these are usually accompanied by higher costs. If no means for limiting the DC output voltage are provided for the rectifier 8, it is sufficient to design the rectifier 8 with six diodes, in particular power diodes.

In the present exemplary embodiment, two DC/DC converters 5a, 5b are provided and connected with the centre point tap 9 and in each case with a potential of the primary DC intermediate voltage circuit 10, 11 as well as in each case with a potential 14, 15 of the secondary DC intermediate voltage circuit. Thereby, it is achieved that the DC/DC converters do not have to be designed for the entire voltage range of the primary DC intermediate voltage circuit 4, but only for half the maximum voltage of the primary DC intermediate voltage circuit. The DC/DC converters 5a, 5b can thus be provided more cost-effectively. They only have to adjust the DC voltage between centre point tap 9 and positive potential 11 as well as centre point tap 9 and negative potential 10 of the primary DC intermediate voltage circuit to the desired voltage of the secondary DC intermediate voltage circuit 6.

In this exemplary embodiment, the DC/DC converters 5a, 5b are designed as buck converters comprising an IGBT 20a, 20b and each an unspecified diode as well as each an inductance. Buck converters are sufficiently known from the prior art; their functioning is not described in more detail here.

Due to the power output provided by the circuit arrangement of 2.5 kW to about 25 MW or more, it is conceivable that the division of the voltage conversion is advantageous with regard to the component designs, because the power output here is also divided between two DC/DC converters.

The means 12 for limiting the DC output voltage of the at least one rectifier preferably have at least one voltage limiter with semiconductor circuit breaker 17, in particular with IGBT modules and limiting resistor 18. IGBT modules are not only robust, but also particularly fast in their switching times, such that a fault state in the secondary DC intermediate voltage circuit 6 or in the DC load 2 or a DC/DC converter 5a, 5b can be responded to particularly quickly. Limiting the DC output voltage of the at least one rectifier 7 happens within 1 to 5 ms. Of course, it is conceivable to provide means for limiting the DC output voltage also for the other rectifier 8.

As can be inferred further from the exemplary embodiment in FIG. 1, the rectifiers 7, 8 connected in series have a B6 bridge circuit with circuit breakers in top/bottom arrangement. The rectifier 8 only has power diodes 21 for rectification. In the top arrangement, power diodes 21 are likewise provided in the rectifier 7 and connected to the centre point tap 9. The bottom circuit breakers are designed as thyristors 13 and connected to the negative potential 10. Not represented in FIG. 1 are the means which switch off the thyristors 13, for example of the rectifier 7, in the event of a fault state. Due to their construction, thyristors are switched off by removing the control signal and the subsequent turning-off during the next current zero-crossing.

A central control unit 19 can detect a fault state due to fault signals from the secondary DC intermediate voltage circuit 6 generated with, for example, means for measuring current and/or voltage, but also preferably due to fault signals of the circuit breakers of the DC/DC converters 20a, 20b, and send corresponding commands to the means 12 for limiting the DC output voltage of the rectifier. Alternatively, a decentralised control unit 19' is represented, which for example processes the fault signals of the circuit breakers 20a, 20b of the DC/DC converter directly and actuates the IGBT 17 immediately in order to achieve time-optimised actuation. Preferably, means of the IGBT modules which are already provided, for example for collector-emitter voltage monitoring, are used here.

As an alternating current source 3, the electrical grid 3 is represented in FIG. 1, which operates as a three-phase grid with a frequency of 50 Hz or a different frequency such as, for example, 60 Hz. The person skilled in the art may have to adapt the grid voltage to the circuit using suitable means such as transformers.

Preferably, means for measuring current and/or for measuring voltage are provided in the secondary DC intermediate voltage circuit 6, which are not represented in FIG. 1. Via the current or voltage measurement, faulty operating states of the at least one DC load can be detected, for example, if the full voltage of the primary DC intermediate voltage circuit is present in the secondary DC intermediate voltage circuit due to a fault in a DC/DC converter.

Via the central control unit 19, in the event of a fault in the secondary DC intermediate voltage circuit 6, in particular in the case of excessive currents and/or excessive voltages in at least one rectifier of the primary DC intermediate voltage circuit 4, at least a part of the circuit breakers 13 or thyristors are switched off or turned off and at least one associated limiting resistor 18 is switched between the centre point tap 9 and negative potential 10 via the semiconductor circuit breaker 17, so that no more energy can flow into the secondary DC intermediate voltage circuit 6 after a particularly short time.

In addition, disconnectors or circuit breakers 16a and 16b are represented in FIG. 1, which can also galvanically isolate the circuit arrangement 1 completely from the alternating current source 3 in the event of a fault. Circuit breakers are preferably provided as disconnectors here, as they are able to safely switch off the required nominal currents. Due to the mechanical design, they usually require approx. 50 to 80 ms until the circuit arrangement is completely galvanically isolated. By contrast, with the circuit arrangement 1 according to the invention and the method according to the invention, a safe switching-off of the secondary DC intermediate voltage circuit 6 in the event of a fault can take place in an extremely short time, such that the DC loads 2 or electrolyser cells are particularly securely protected against damage in the event of a fault.

All references, including publications, patent applications, and patents cited herein are hereby incorporated by reference to the same extent as if each reference were individually and specifically indicated to be incorporated by reference and were set forth in its entirety herein.

It should be understood that the figures illustrate exemplary embodiments in detail, and it should be understood that the present application is not limited to the details or methodology set forth in the description or illustrated in the figures. It should also be understood that the terminology is for purpose of description only and should not be regarded as limiting.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A circuit arrangement for providing electrical power for at least one DC load, in particular for at least one electrolyser cell, from at least one alternating current source having a primary DC intermediate voltage circuit, which is connected via at least one DC/DC converter to a secondary DC intermediate voltage circuit, which supplies the at least one DC load with electrical power,
wherein the primary DC intermediate voltage circuit is supplied with electrical power of the alternating current source via two rectifiers connected in series such that a centre point tap is provided, at least one of the rectifiers connected to the primary DC intermediate voltage circuit has switchable circuit breakers and means are provided which can switch off at least a part of the switchable circuit breakers of this rectifier as soon as a fault state is detected in the DC load, in the secondary DC intermediate voltage circuit and/or in the at least one DC/DC converter, and means for limiting a DC output voltage of the associated rectifier are provided between the centre point tap of the primary DC intermediate voltage circuit and at least one DC potential of the primary DC intermediate voltage circuit, which can limit the DC output voltage of at least one of the rectifiers connected in series in the event of a fault state in the DC load, in the secondary DC intermediate voltage circuit and/or in at least one of the DC/DC converters.

2. The circuit arrangement according to claim 1, wherein two DC/DC converters are provided for the secondary DC intermediate voltage circuit, wherein both DC/DC converters are electrically conductively connected in each case with a different DC potential of the secondary DC intermediate voltage circuit and with the centre point tap and in each case with a DC potential of the primary DC intermediate voltage circuit that is different from the centre point tap.

3. The circuit arrangement according to claim 1, wherein the circuit arrangement is designed to provide the at least one DC load with a power of 2.5 kW to 25 MW or more, preferably 100 kW to 10 MW.

4. The circuit arrangement according to claim 1, wherein at least one voltage limiter with at least one semiconductor circuit breaker, in particular at least one IGBT module, and with a limiting resistor is provided as a means for limiting the DC voltage.

5. The circuit arrangement according to claim 1, wherein disconnectors or switchable circuit breakers are provided for galvanic isolation of the alternating current source from the rectifiers of the primary DC intermediate voltage circuit.

6. The circuit arrangement according to claim 5, wherein the means for limiting the DC output voltage of the at least one rectifier, the means for switching off the circuit breakers of the rectifiers and/or the means for galvanically isolating the circuit arrangement from the alternating current source are controlled by at least one or a plurality of separate, decentralised control units or by a central control unit.

7. The circuit arrangement according to claim 1, wherein the at least one DC/DC converter is provided in the form of buck converters with circuit breakers.

8. The circuit arrangement according to claim 1, wherein means for measuring current and/or for measuring voltage are provided in the secondary DC intermediate voltage circuit and/or in the DC load, which can detect fault states in the secondary DC intermediate voltage circuit, the DC load and/or the at least one DC/DC converter.

9. The circuit arrangement according to claim 1, wherein means for sensing fault states are provided in at least one DC/DC converter, which can detect fault states in one of the circuit breakers of the at least one DC/DC converter.

10. The circuit arrangement according to claim 1, wherein at least one alkaline electrolyzer cell, at least one AEM (anion exchange membrane) electrolyzer cell and/or PEM (proton exchange membrane or also polymer electrolyte membrane) electrolyzer cell and/or at least one solid oxide electrolyzer cell (SOEC) are provided as at least one DC load.

11. A method for providing electrical power of at least one alternating current source for at least one DC load, preferably at least one electrolyzer cell, with a circuit arrangement according to claim 1, comprising:
reducing at least one of the DC output voltages of the rectifiers of the primary DC intermediate voltage circuit via the means for limiting the DC output voltage in the event of a fault state in the at least one DC load, in the secondary DC intermediate voltage circuit and/or at least one of the DC/DC converters.

12. The method according to claim 11, further comprising:
switching off at least one circuit breaker of at least one of the two rectifiers of the primary DC intermediate voltage circuit connected in series in the event of a fault state in the at least one DC load, in the secondary DC intermediate voltage circuit and/or at least one of the DC/DC converters.

13. The method according to claim 11, further comprising:
galvanically isolating the alternating current source from the rectifiers connected in series by disconnectors or by circuit breakers in the event of a fault state in the at least one DC load, in the secondary DC intermediate voltage circuit and/or at least one of the DC/DC converters.

14. The method according to claim 11, further comprising:
stopping the actuation of circuit breakers of the DC/DC converters in the event of a fault state in the at least one DC load, in the secondary DC intermediate voltage circuit and/or at least one of the DC/DC converters.

15. The method according to claim 11, further comprising:
detecting an excessively high voltage or an excessively high current in the secondary DC intermediate voltage circuit, in the DC load and/or a fault state of a circuit breaker of the DC/DC converters as a fault state.

* * * * *